United States Patent [19]

Bouchard et al.

[11] 4,278,420

[45] Jul. 14, 1981

[54] PHOTOFLASH LAMP, METHOD OF MAKING SAME, AND PHOTOFLASH CIRCUIT

[75] Inventors: Andre C. Bouchard, Peabody; Naila S. Jirmanus, Somerville, both of Mass.

[73] Assignee: GTE Products Corporation, Stamford, Conn.

[21] Appl. No.: 57,770

[22] Filed: Jul. 16, 1979

[51] Int. Cl.³ .................................... F21K 5/02

[52] U.S. Cl. .................................... 431/362; 431/359; 362/15

[58] Field of Search ............... 431/358, 359, 362, 365, 431/357; 362/11, 13, 15; 315/73; 200/237

[56] References Cited

U.S. PATENT DOCUMENTS

| | | | |
|---|---|---|---|
| 2,263,179 | 11/1941 | Lockwood | 431/362 |
| 2,305,561 | 12/1942 | Sylvester | 431/362 |
| 2,783,632 | 3/1957 | Eppig | 431/362 |
| 2,791,111 | 5/1957 | Gleim | 431/362 |
| 3,685,947 | 8/1972 | Meulemans | 431/362 |
| 3,738,791 | 6/1973 | Cressman | 431/359 |
| 3,823,994 | 7/1974 | De Graaf et al. | 431/362 X |
| 3,873,260 | 3/1975 | Cote | 431/362 |
| 3,873,261 | 3/1975 | Cote | 431/362 |

*Primary Examiner*—Samuel Scott
*Assistant Examiner*—Randall L. Green
*Attorney, Agent, or Firm*—Lawrence R. Fraley

[57] ABSTRACT

An electrically-activated photoflash lamp which includes a glass envelope, combustion-supporting (e.g. oxygen) atmosphere, a quantity of filamentary combustible material (e.g. zirconium), and an ignition means including a pair of spaced leads sealed within the envelope and a primer mass for igniting the combustible material. The primer mass includes a first quantity of substantially non-ignitable primer material having a second quantity of highly ignitable primer material located thereon. Use of the first primer material permits pulsing of the lamp in air prior to application of the second primer material to thereby assure uniform ignition voltages between lamps similarly treated. A circuit utilizing a plurality of the above lamps and a method for producing said lamps are also disclosed.

22 Claims, 5 Drawing Figures

PHOTOFLASH LAMP, METHOD OF MAKING SAME, AND PHOTOFLASH CIRCUIT

DESCRIPTION

1. Technical Field

The present invention relates to electrically-activated photoflash lamps and to circuitry employing such lamps.

Lamps of this type are generally classified into two varieties: low-voltage and high-voltage. Low-voltage photoflash lamps typically include a glass envelope with a combustion-supporting gas (e.g. oxygen) and a quantity of filamentary, combustible material (e.g. shredded zirconium) therein. A pair of electrically conductive lead wires are usually sealed in one end of the envelope and extend therein. A filament is utilized and interconnects the extending ends of the wires. When the filament is heated by a firing current usually generated from a low-voltage source such as battery or charged capacitor (e.g. having a voltage of from about 1.5 to 15 volts), it ignites a primer material which then ignites the combustible material to produce a flash of light. Naturally, the oxygen gas aids in the above ignition. In high-voltage lamps, the use of a filament is usually excluded by the provision of a glass or ceramic bead in which are located the extending ends of the lamp's conducting wires. Primer material serves to bridge the portions of these ends which project through the bead. High-voltage lamps also include the aforedescribed filamentary material and combustion-supporting gas. Flashing is accomplished by a firing pulse approaching a few thousand volts and usually provided by a piezoelectric element. In another type of high-voltage lamp, the primer is located within an indentation in the bottom of the lamp and the conductive wires extend therein.

The teachings of the instant invention are particularly concerned with high voltage lamps, although it will be understood from the following that said teachings may be readily extended to lamps of the earlier generation, low voltage variety.

2. Background

It has long been highly desirous in the photoflash industry to manufacture high voltage lamps having minimal variations in lamp-to-lamp ignition voltages. Such a feature understandably facilitates design of circuits utilizing these lamps. Typically, such lamps are arranged in parallel and are fired (flashed) by connecting successive lamps sequentially across a suitable firing pulse source (e.g. a piezoelectric element) associated with the camera to which the multiple lamp array is connected. This source typically provides a pulse in synchronization with the camera's shutter each time a flash picture is to be taken. Excessive pulse variations may result in the lamp being unable to fire or firing with an unsuitable light output. Further regarding this operating characteristic, the ignition voltage must be sufficiently high in order that the lamp is not easily susceptible to accidental flashing from electrostatic charges which typically build up during lamp handling. It has been our experience that high voltage lamps requiring less than about 200 volts for ignition are too sensitive to inadvertent static discharge while lamp flashing at greater than 1800 volts are similarly undesirable because typical voltages available to each lamp in today's conventional circuitry do not exceed this value.

Known prior art attempts to obtain consistent flashing properties in photoflash lamps are defined in U.S.

Pat. Nos. 3,685,947 (Meulemans et al) and 3,873,260 (Cote). In summary, it is proposed therein that minimal ignition voltage variations are possible through maintenance of precisioned spacings between the in-lead conductors at the region where the lamp's primer mass is located. Several problems are inherent in these and similar schemes, including the following:

1. Precisioned gap spacings are extremely difficult to maintain in a high production environment;

2. Variations in primer thickness, homogeneity, or drying temperature alter the ignition voltage thereof;

3. Physical engagement with the primer mass by the filamentary combustible material may affect ignition voltages.

In view of the above, it is not difficult to understand why ignition voltage histograms of various samplings of high voltage photoflash lamps produced in accordance with present technological standards each indicate firing voltage ranges having a spread of anywhere from about 900 to 1300 volts. In one example, a sampling of approximately 100 lamps showed ignition voltages ranging from about 300 to 1200 volts, with most lamps (26 percent) firing at 700 volts. In another sampling, the firing voltages ranged from 400 to 1700 volts with the greatest percentage (29 percent) at 800 volts. The above substantial differences preclude utilization of such lamps in photoflash products demanding uniform flashing characteristics.

It is believed, therefore, that a photoflash lamp which can be produced in an expeditious and inexpensive manner at high production speeds while assuring uniformity of ignition voltages thereof would constitute a significant advancement in the art.

It is also believed that a method for producing such lamps would constitute a significant art advancement.

It is even further believed that a new and unique circuit arragement employing high voltage lamps possessing consistent ignition voltages would represent a substantial promotion of the photoflash lamp field.

DISCLOSURE OF THE INVENTION

It is a primary object of the present invention to provide an electrically-activated photoflash lamp which can be readily manufactured at high production rates while assuring uniform ignition voltages therefor.

It is yet another object of the instant invention to provide a photoflash circuit which utilizes a plurality of the above lamps and assures sequential activation thereof in a preselected manner.

In accordance with one aspect of the invention, there is provided an improved photoflash lamp including a hermetically-sealed, light-transmitting envelope containing a combustion-supporting atmosphere and a quantity of combustible material therein. The lamp also includes an ignition means for igniting the combustible material including a pair of spaced conductors and a primer mass. The primer mass includes two different quantities of primer material, the first being defined as substantially non-ignitable so as to permit pulsing of the lamp without ignition prior to application of the second quantity and finishing of the lamp. The second quantity is readily ignitable and thereby serves to ignite the lamp's combustible material upon application of a suitable ignition voltage across the lamp's projecting conductors. Pulsing of a number of lamps in this manner had a stabilizing effect on the maximum ignition voltages of these lamps in comparison to the afore-described prior art versions in that both the mean ignition voltage and the ignition voltage range over which the lamps could be fired were significantly reduced.

According to another aspect of the invention, a method is provided for making an electrically-activated photoflash lamp. The method comprises providing a tubular, light-transmitting (e.g. glass) member having opposing open ends, sealing a pair of spaced conductors in a first end, locating a first quantity of primer in electrical contact with end portions of the conductors which have access to the interior of the tubular member, pulsing the first quantity of primer, and thereafter locating a second quantity of primer on the pulsed first quantity. A filamentary, combustible material (e.g. zirconium) is added as well as a combustion-supporting atmosphere (e.g. oxygen) after which the second end is sealed to define an envelope containing the above components.

In accordance with yet another aspect of the invention, there is provided a photoflash circuit which includes at least two of the aforedefined lamps and at least one arc gap member joined in electrical series with one of the lamps. The two lamps are in turn connected in a parallel arrangement which is adapted for being connected across a source of firing voltage pulses whereby the two lamps can be sequentially flashed.

BEST MODE FOR CARRYING OUT THE INVENTION

For a better understanding of the present invention together with other and further objects, advantages and capabilities thereof, reference is made to the following disclosure and appended claims in connection with the above described drawings.

Figure 1:
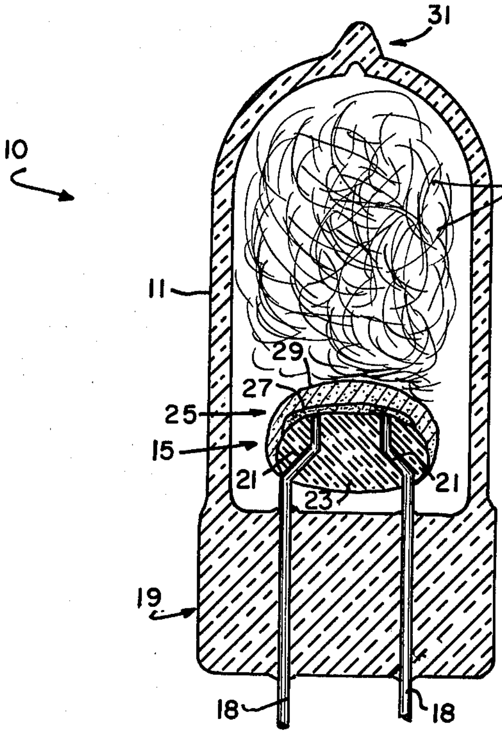
FIG. 1 is an elevational view, in section, of a photoflash lamp in accordance with a preferred embodiment of the invention.

With particular reference to FIG. 1, there is shown a photoflash lamp 10 in accordance with a preferred embodiment of the invention. Lamp 10 includes a hermetically-sealed, light-transmitting envelope 11, preferably of a glass material (e.g., borosilicate), and containing a combustion-supporting atmosphere (e.g. oxygen) and a quantity of filamentary combustible material 13 (e.g. zirconium, hafnium) therein. The oxygen is established at a pressure of about 8 atmospheres. The preferred quantity of combustible material 13 is about 15–20 mg. Lamp 10 further includes an ignition means 15 for igniting material 13. Means 15 comprises a pair of spaced electrical conductors (e.g. metallic in-leads) 18 which are sealed within a first end 19 of lamp 10 and include end portions 21 which have access to the interior of the lamp's glass envelope. Conductors 18 are preferably 0.014 inch diameter wires of a nickel-iron alloy and are located about 0.030 inch apart in end 19. Conductors 18 project from envelope 11 and are thus readily adaptable for being connected to various circuit elements typically used in photoflash products. Ends 21 are shown to extend within the interior of envelope 11 and be secured within an insulative member 23 (e.g. a glass bead). It is understood, however, that member 23 may be eliminated and ends 21 oriented within an indentation, groove, etc., located within the bottom of the envelope.

Lamp 10 includes a new and unique primer mass 25 positioned on glass bead 23 in electrical contact with ends 21 of conductors 18 and adapted for igniting material 13. Mass 25, constituting a part of ignition means 15, is comprised of two different types of primer material. The first is a quantity (e.g. about 2 mg.) of substantially non-ignitable primer material 27 located on glass bead in electrical contact with ends 21. By the term "substantially non-ignitable" is meant a primer material which, when applied, is incapable of being ignited in air by a voltage ignition pulse as provided by power sources (e.g. piezoelectric elements) typically utilized in many of today's cameras. A typical piezoelectric element provides a high voltage, low energy pulse which may approach 5000 volts. It is understood that this pulse is impressed across conductors 18.

First primer material 27, in order to assure the described nonigniting characteristic, is substantially free of an oxidizing agent typically employed in known primer materials for high voltage lamps. By substantially free means that material 27 contains no more than about 5 percent of said agent. In one embodiment, material 27 included a combustible, particulate fuel and a binding agent, both of said components typically found in many primer materials for high voltage lamps also containing an oxidizing agent. Suitable fuels may be chosen from powders of zirconium, hafnium, thorium, aluminum, magnesium, boron, silicon, or alloys thereof, with the preferred being zirconium. Suitable binding agents include nitrocellulose, polyvinylalcohol, hydrozyethycellulose, methoxycellulose, and polyvinyl pyrrolidone, with preference given toward nitrocellulose. The zirconium consisted of about 85 to 95 percent by weight of the total material's dry composition while the binding agent constituted from about 1 to 5 percent. It is also possible to include a quantity of finely divided, non-conductive inert material as part of material 27. For example, fumed alumina, silica, or titania having a particle size of about 5 microns and substantially finer than the fuel could be added. Use of such a material serves to enhance sensitivity and reliability of the final mixture by providing a series of dielectric interfaces separating the zirconium fuel particles to in effect increase the resistance of the current path(s) through the primer material. Another apparent result of providing this additive is a better source impedance matching and thereby dissipation of a greater percentage of the available pulse energy into the primer material 27. The preferred inert additive is fumed alumina, said material when added comprising from about 1 to 7 percent by weight of the total composition. By way of specific example, a first primer containing about 94 percent zirconium, 2 percent nitrocellulose, and 4 percent fumed alumina was successfully used.

Primer mass 25 further includes a second primer material 29 which differs in operating characteristics from first material 27 in that it is readily ignitable. By the term "readily ignitable" is meant a primer material which rapidly ignites in air upon application of a high voltage, low energy pulse thereto as typically provided by today's high voltage pulse sources. It is understood that both materials 27 and 29 will of course ignite (though the first much slower than the second) in an atmosphere containing a high oxygen concentration. Approximately 1 mg. of material 29 was applied to first material 27, said material including a combustible particulate fuel, an oxidizing agent, and a binding agent. Fuels and binding agents suitable for use include those described above for non-ignitable primer material 27, with preference again given toward zirconium and nitrocellulose. The zirconium comprised from about 50 to 85 percent by weight of the dried mixture while the nitrocellulose binder represented about 1 to 4 percent. The chosen oxidizing agent was potassium perchlorate which constituted from about 15 to 50 percent of the dried material. Other suitable oxidizing agents include alkali metal and alkaline earth metal chlorates as well as sodium chlorate, and potassium chlorate. The aforedefined inert materials, preferably fumed alumina, can also be added if desired. Such an additive would comprise from about 1 to 7 percent of the total mixture. By way of specific example, a second primer containing about 78 percent zirconium, 16 percent potassium perchlorate, 4 percent fumed alumina, and 2 percent nitrocellulose was successfully used.

Production of lamp 10 involves providing an elongated tubular glass member (which eventually will become envelope 11) having opposing open ends. Conductors 18, having the glass bead 23 (if desired) thereon, are aligned within one of the open ends afterwhich this end is hermetically sealed utilizing press-sealing techniques well known in the lamp manufacturing art. The sealed conductors and bead assume the respective locations illustrated in FIG. 1. The described first open end as sealed has thus become end 19. The next step involves positioning mass 25 on glass bead 23. Firstly, material 27, in slurry form, is applied to the illustrated upper surface of bead 23 such that contact with ends 21 of conductors 18 is assured. The wet material is thereafter dried by positioning the structure as completed to this stage in a forced hot air oven at approximately 100° Celsius for about 5 to 15 minutes. After drying, the structure is removed and primer material 27 pulsed in an air environment. In one example, this was accomplished using an Eastman Kodak Ectra II, 4500 V pulse source having a pulse width of about 3 microseconds. This source was connected to the projecting portions of conductors 18.

Understandably, a significant advantage of being able to pulse unfinished lamps in an air environment without causing ignition is that such a technique readily lends itself to mass production. It must also be understood, however, that pulsing can be performed in vacuum or inert gas environments but the described advantage would of course be lost.

The next step in the production of lamp 10 involves application of the readily ignitable, second quantity of primer material 29 to the dried first material 27 such that physical contact is effected with at least a portion thereof. Preferably, second material 29 is applied in slurry form to substantially cover first material 27. Thereafter, this material is dried by directing heated air at about 100° Celsius into the remaining (second) open end of the glass tube for a period of between 5 and 15 minutes. One means of determining whether second coating 29 has been satisfactorily applied is to measure the reflectivity or absorption of this coating. Understandably, the second coating would be optically different from the first, which could be assured by providing the second material with a suitable, colored additive.

The next step in producing lamp 10 involves positioning the described quantity of filamentary material 13 within envelope 11 through the unsealed end of the tubular member. Thereafter, oxygen is introduced and the second end "tipped-off" to define the upper end or tip portion 31 of the lamp's envelope. Tipping is a well known manufacturing process and further definition is thus not deemed necessary.

Results of testing several hundred lamps prepared in the manner defined above produced the surprising finding that the second primer had substantially no effect on the pulsed electrical properties of the first primer. This was considered extremely significant because it means that the aforedescribed uniform ignition voltages for these lamps can be assured for practically all types of second, more volatile primer materials. Accordingly, substitution of various fuels and oxidizing agents can occur without adversely affecting ignition voltage characteristics. It is believed that the above is possible due to the ignition of primer mass 25 occurring initially somewhere along the pulsed, conductive path of the first primer 27 afterwhich sparks, hot particles, etc., therefrom are emitted instantly from this region to ignite the more volatile, second primer. This belief is supported by testing of several lamps containing only the described first primer 27. This material was able to combust in the oxygen atmosphere of the sealed envelope but burned very slowly with few sparks, etc., thrown upwardly. Contrarily, sparks of incandescent zirconium appeared in less than 0.25 microseconds after ignition of lamps having both primers.

As stated, a key feature of the present invention is that lamps produced in accordance with the teachings thereof possessed substantially greater uniformity in ignition voltages than known prior art lamps. In one example, a sample population of 100 lamps possessed ignition voltages ranging from only 200 to 500 volts with the large majority (about 67 percent) firing at 400 volts. The next highest grouping (about 26 percent) flashed at 300 volts, while 5 percent flashed at the 500 volt level. The foregoing statistics clearly represent a significantly smaller and more uniform firing voltage range in comparison to the aforedescribed sampling of the prior art lamps.

Another feature of the instant invention considered significant is that the described process permits non-destructive electrical measurement of the lamp prior to final completion thereof. Accordingly, primers not meeting certain production specifications can be readily rejected. Those proving satisfactory simply have the second primer added and the remaining steps performed. Furthermore, the above measurements are possible in a production setting by simply connecting the oscilloscope or similar measuring instrument and a suitable power source to the production line at appropriate locations.

Yet another important feature of the invention was that of several hundred completed lamps flashed, none exhibited adverse interaction of the primer mass by the filamentary material 13. Usually, the shredded or filamentary zirconium in high voltage photoflash lamps makes physical contact at several different locations on the primer's surface to thus form a plurality of short circuit paths. The result of course was that in a given population of several lamps, ignition characteristics tended to vary substantially. The present invention eliminates this possibility due to the flow of electrical current through the low resistance conductor's path of the first primer 27 during lamp ignition. The above feature is further assured by completely covering the first primer with second primer 29.

Lamp 10 thus possesses many significant advantages over prior art high voltage lamps which attempted to minimize ignition voltage discrepancies using such techniques as precisioned spacing between the lamp's in-leads. As described above, the effects of variables such as differences in in-lead spacings have been substantially nullified by the present invention. That is, uniform ignition voltages were obtainable for a large population of lamps produced in the defined manner despite relatively large differences in in-lead spacings at the lamp's glass bead.

Figure 2:
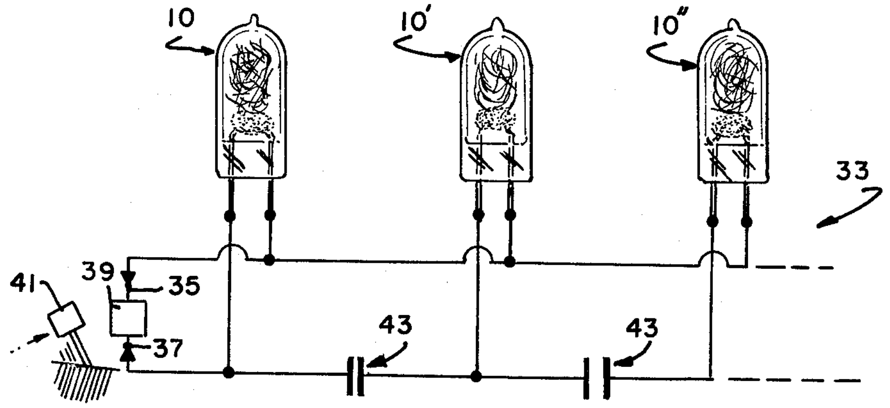
FIG. 2 is a circuit diagram, in both pictoral and schematic illustration, of a photoflash circuit utilizing a plurality of the lamps of FIG. 1.

In FIG. 2 there is illustrated a photoflash circuit 33 containing a plurality of high voltage photoflash lamps 10, 10', 10", etc., all joined in parallel arrangement adapted for being connected (at terminals 35, 37) across a high voltage pulse source 39. Lamps 10, 10', 10", etc., are all similar to lamp 10 in FIG. 1 and thus possess uniform ignition voltages (e.g. 400 volts). Circuit 33 is designed such that the lamps are flashed sequentially in response to sequential pulses from source 39. Source 39 represents a typical piezoelectric element found in many of today's cameras and may be produced from barium titanate, lead metaniobate, lead-zirconium-titanate, or other suitable materials. Impact on element 39 (e.g. such as provided by an adjacent, spring-loaded impactor 41 synchronized to the camera's shutter) produces a firing pulse at terminals 35 and 37 and thus to circuit 33 when the product (e.g. a "flip-flash", "flash-bar", etc.) in which the circuit is located is positioned within the camera's socket. In typical "flip-flash" products, for example, circuit 33 would be formed on one surface of polystyrene circuit board with each lamp anchored within respective eyelets therein. Understandably, it is desirous in such products that the lamps flash in a particular sequence and that only one lamp fire upon application of each pulse at terminals 35 and 37. Circuit 33 assures that the above will occur by utilization of an arc gap member 43 respectively joined in electrical series with a corresponding number of lamps. That is, if circuit 33 includes a minimum of two lamps, a single arc gap member would be joined in series with the second lamp (10') to be flashed. Circuit 33 will thus function as follows. Upon occurrence of a first firing pulse, lamp 10 will flash since it receives the full firing pulse energy. Arc gap member 43 serves to prevent this energy from reaching lamp 10' (as well as lamp 10", etc. if more were used). Upon occurrence of a second pulse, lamp 10 is an open circuit and hence arc gap member 43 will breakdown, causing the second lamp 10' to flash. A third pulse will result in lamp 10" flashing, etc. The above sequence is assured by requiring that the arc gap member connected to lamp 10' possess a smaller breakdown voltage than that of the member associated with subsequent lamp 10".

In one embodiment of the invention, gap members 43 were produced by razor cuts in the conductive paths interconnecting the circuit's lamps. That is, predetermined spacings were made in the conductive paths or elements (e.g. silver paint) located on the polystyrene circuit board. For example, a single cut having a width of 0.002 inch was made for the member of lamp 10' while a cut 0.004 inch wide was used for lamp 10". Approximately fifty separate groupings of three lamps each were flashed with no disorder or "double flashing" observed. Average flashing voltages for lamps 10, 10', and 10" were about 230, 1040, and 1400 volts respectively, when sequential firing pulses of about 3500 volts were impressed across terminals 35 and 37.

Figure 3:
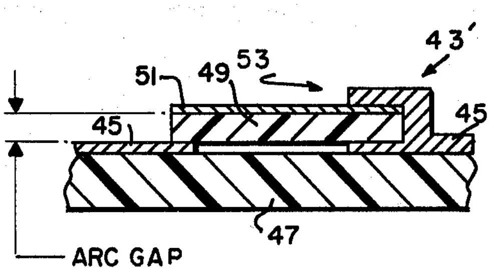
FIGS. 3 and 4 represent various embodiments of arc gap members adapted for use in the photoflash circuit of FIG. 2.
Figure 4:
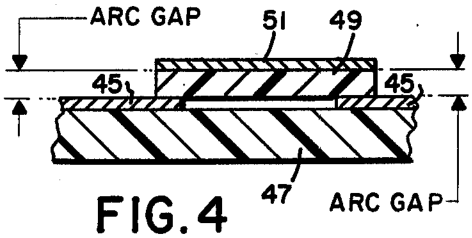

FIG. 3 represents an alternative embodiment of an arc gap member for use in circuit 33. Member 43' comprises a pair of spaced conductor elements or paths 45 (e.g. silver paint) located in a spaced relationship or an insulative substrate 47 (e.g. a polystyrene board). An insulative (e.g. Mylar) member 49 is positioned atop elements 45 to interconnect these physically. Member 49 has a thickness of about 0.001 inch and includes a conductive (e.g. aluminum) path 51 positioned on top thereof. Path 51 is electrically joined at one end (53) to one of the elements 45 but is spaced from the remaining element by the thickness of member 49. The arc gap thus formed (illustrated in FIG. 3) comprises a 0.001 inch spacing betwen path 51 and one of the elements 45. In the embodiments of FIG. 4, the connection between path 51 and element 45 is eliminated to produce a pair of spaced, arc gaps each having a 0.001 inch spacing. The arc gap member of FIG. 4 will thus possess a breakdown voltage of about twice that of the member of FIG. 3.

It must be emphasized with regard to the arc gap members used in the instant invention that the gaps between conductors must be located immediately adjacent an insulative substrate member. In the case of razor cut members, this substrate is the polystyrene circuit board. In the case of the members of FIGS. 3 and 4, these surfaces are the upright sides of the Mylar spacers. These "surface breakdown" arrangements not only result in lower breakdown voltages but also voltages possessing greater consistency and reliability than "air" gap embodiments, which are known to provide considerable variations in breakdown voltages. It is further understood with regard to the invention that the different voltage breakdown values for each arc gap member 43, 43', etc. are less than the voltage of each of the corresponding firing pulses.

Figure 5:
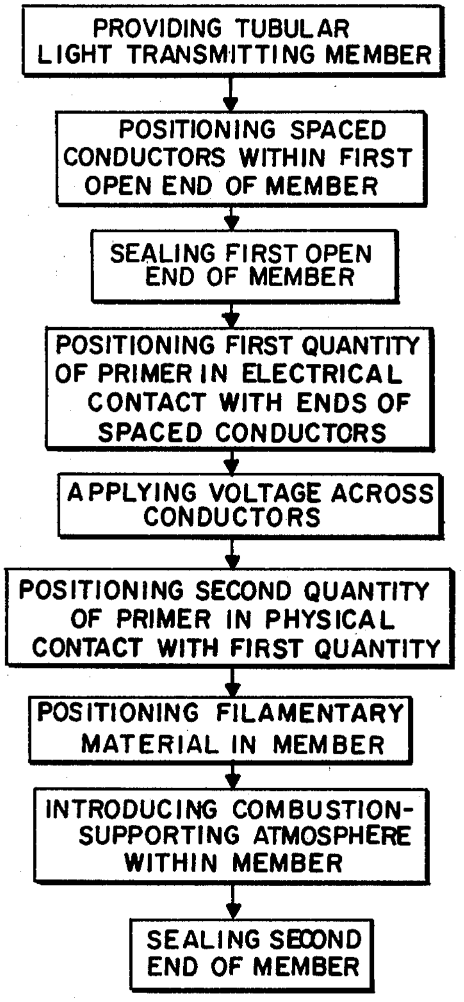
FIG. 5 is a flow chart representing the preferred steps of producing the photoflash lamp of FIG. 1.

The flow chart in FIG. 5 represents the steps, as described above, in the method of producing lamp 10.

While there have been shown and described what are at present considered the preferred embodiments of the invention it will be obvious to those skilled in the art that various changes and modifications may be made therein without departing from the scope of the invention as defined by the appended claims.

We claim:

1. In a photoflash lamp including a hermetically-sealed, light-transmitting envelope having a combustion-supporting atmosphere and a quantity of filamentary combustible material therein, and an ignition means for igniting said combustible material including a pair of spaced electrical conductors and a primer mass, each of said conductors sealed within said envelope and projecting therefrom and having an end portion having access to the interior of said envelope, the improvement wherein said primer mass comprises:

a first quantity of pulsed, substantially non-ignitable primer material positioned in electrical contact with both of said end portions of said electrical conductors; and a second quantity of readily ignitable primer material located in physical contact with at least a portion of said first quantity of primer material.

2. The improvement according to claim 1 further including an electrically insulative member located within said envelope, said end portions of said electrical conductors secured therein and said first quantity of primer material located thereon.

3. The improvement according to claim 2 wherein said insulative component comprises a glass bead.

4. The improvement according to claim 1 wherein said first quantity of primer material is substantially free of an oxidizing agent.

5. The improvement according to claim 4 wherein said first quantity of primer material includes a combustible, particulate fuel and a binding agent, said combustible fuel comprising from about 85 to about 95 percent by weight of said first quantity, said binding agent comprising from about 1 to about 5 percent by weight of said first quantity.

6. The improvement according to claim 5 wherein said first quantity of primer material further includes an additive of finely divided inert, nonconductive material, said inert material comprising from about 1 to about 7 percent by weight of said first quantity.

7. The improvement according to claim 6 wherein said combustible fuel is zirconium, said binding agent is nitrocellulose, and said inert material is fumed alumina.

8. The improvement according to claim 4 wherein said second quantity of primer material comprises a combustible particulate fuel, an oxidizing agent, and a binding agent, said fuel comprising from about 50 to about 85 percent by weight of said second quantity, said oxidizing agent comprising from about 15 to about 50 percent by weight of said second quantity, and said binding agent comprising from about 1 to 4 percent by weight of said second quantity.

9. The improvement according to claim 8 wherein said second quantity of primer material further includes an additive of finely divided, inert nonconductive material, said inert material comprising from about 1 to about 7 percent by weight of said second quantity.

10. The improvement according to claim 9 wherein said combustible fuel is zirconium, said oxidizing agent is potassium perchlorate, said binding agent is nitrocellulose, and said inert material is fumed alumina.

11. A method of making a photoflash lamp, said method comprising:

providing a tubular, light-transmitting member having first and second open ends;

positioning a pair of spaced-apart electrical conductors within a first of said open ends;

hermetically sealing said first open end to include said conductors therein such that each of said conductors project therefrom and include an end portion having access to the interior of said tubular member;

positioning a first quantity of substantially non-ignitable primer material in electrical contact with said end portions of said conductors through said second open end;

applying a voltage across said electrical conductors to subject said first quantity of primer material to an electrical breakdown, and thereafter positioning a second quantity of readily ignitable primer material in physical contact with at least a portion of said first quantity of primer material through said second open end;

positioning a quantity of filamentary combustible material within said tubular, light-transmitting member through said second open end;

introducing a combustion-supporting atmosphere within said tubular, light-transmitting member through said second open end; and sealing said second end to define a hermetically-sealed envelope.

12. The method according to claim 11 wherein said first quantity of primer material is subjected to said electrical breakdown in air.

13. The method according to claim 11 wherein said first quantity of primer material is positioned in contact with said conductors in slurry form and thereafter dried prior to said electrical breakdown.

14. The method according to claim 13 wherein said first quantity of primer material is dried using forced hot air.

15. The method according to claim 11 wherein said second quantity of primer material is positioned in physical contact with said first quantity of primer material in slurry form and thereafter dried.

16. The method according to claim 15 wherein said second quantity of primer material is dried using forced hot air.

17. The method according to claim 11 further including securing end portions of said electrical conductors within an electrically insulative member prior to positioning said conductors within said first open end of said light-transmitting member.

18. A photoflash circuit comprising:

at least two photoflash lamps electrically joined in a parallel arrangement for being sequentially flashed by sequential firing voltage pulses, said parallel arrangement adapted for being connected across a source of said firing voltage pulses, each of said photoflash lamps including a hermetically-sealed, light-transmitting envelope having a combustion-supporting atmosphere and a quantity of filamentary combustible material therein and an ignition means for igniting said combustible material including a primer mass and a pair of spaced electrical conductors sealed within said envelope and projecting therefrom and having an end portion having access to the interior of said envelope, said primer mass including a first quantity of pulsed, substantially non-ignitable primer material positioned in electrical contact with both of said end portions of said conductors and a second quantity of readily ignitable primer material located in physical contact with at least a portion of said first quantity of primer material, each of said photoflash lamps having substantially similar ignition voltages; and at least one arc gap member connected in electrical series with one of said photoflash lamps.

19. The photoflash circuit according to claim 18 wherein said arc gap member comprises a pair of conductive elements spaced apart a predetermined distance, said conductive elements positioned on an electrically insulative substrate.

20. The photoflash circuit according to claim 19 wherein said arc gap member further comprises an insulative member located atop and interconnecting each of said conductive elements, and a conductive path positioned atop said insulative member and including a first and second end portions respectively located a preestablished distance from one of said conductive elements.

21. The photoflash circuit according to claim 19 wherein said arc gap member further comprises an insulative member located atop and interconnecting each of said conductive elements and a conductive path positioned atop said insulative member and including first and second end portions, said first end portion located a preestablished distance from a first of said conductive elements, said second end portion positioned in electrical contact with a second of said conductive elements.

22. The photoflash circuit according to claim 18 wherein the number of said photoflash lamps is at least three and the number of arc gap members is at least two, said arc gap members respectively connected in electrical series with a similar number of said photoflash lamps thereby forming a plurality of series arrangements connected in parallel, each of said arc gap members having different voltage breakdown values each less than the voltage of said firing voltage pulses.

* * * * *